(No Model.)

6 Sheets—Sheet 1.

F. H. RICHARDS.
WEIGHING MACHINE.

No. 565,219.

Patented Aug. 4, 1896.

Witnesses:
R. W. Pittman
Fred. J. Dole.

Inventor:
F. H. Richards.

(No Model.) 6 Sheets—Sheet 2.

F. H. RICHARDS.
WEIGHING MACHINE.

No. 565,219. Patented Aug. 4, 1896.

Witnesses:
R. W. Pittman
Fred. J. Dole.

Inventor:
F. H. Richards.

(No Model.) 6 Sheets—Sheet 3.
F. H. RICHARDS.
WEIGHING MACHINE.
No. 565,219. Patented Aug. 4, 1896.
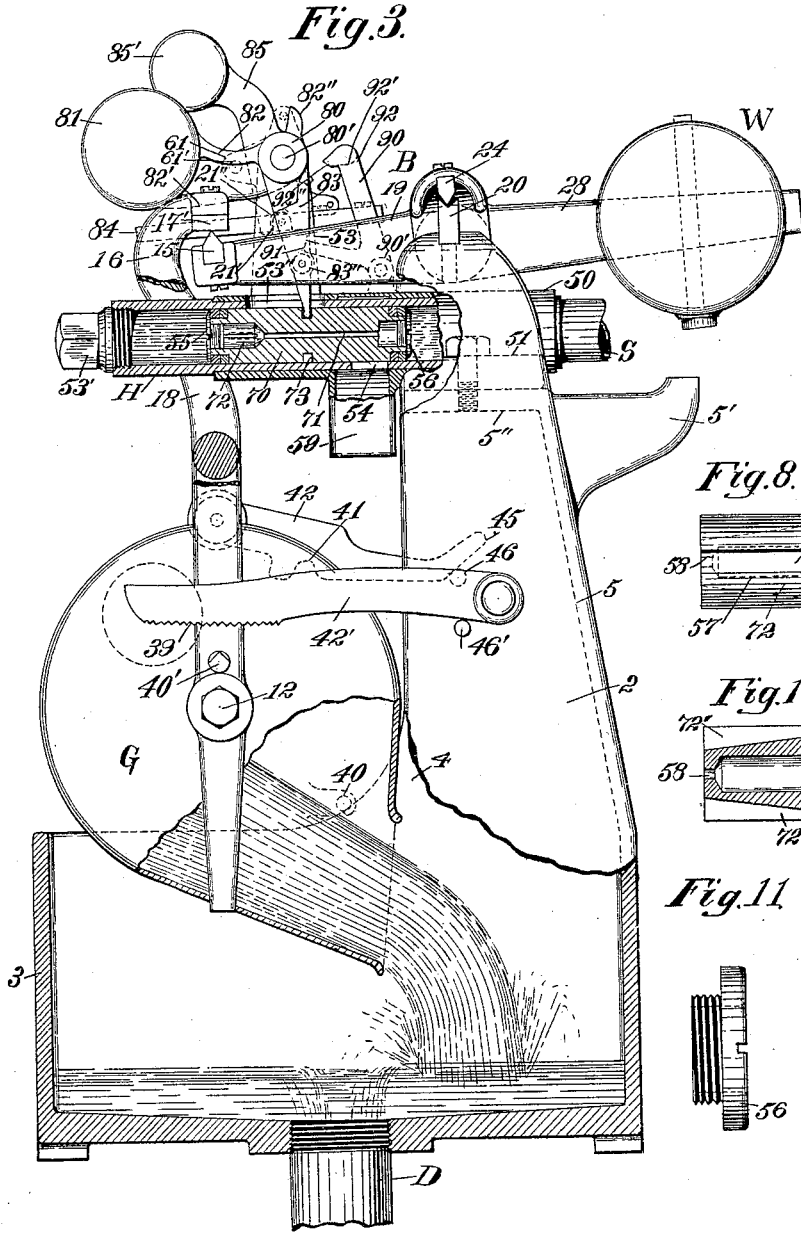
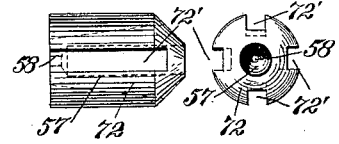
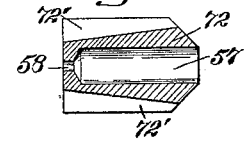
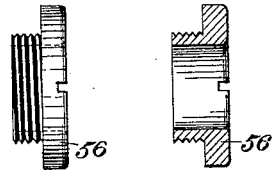
Witnesses:
R. W. Pittman
Fred. J. Dole.
Inventor:
F. H. Richards.

(No Model.)  F. H. RICHARDS.  6 Sheets—Sheet 4.
WEIGHING MACHINE.

No. 565,219.  Patented Aug. 4, 1896.

Witnesses:
R. W. Pittman
Fred. J. Dole.

Inventor:
F. H. Richards.

(No Model.) 6 Sheets—Sheet 5.

F. H. RICHARDS.
WEIGHING MACHINE.

No. 565,219. Patented Aug. 4, 1896.

Witnesses:
R. W. Pittman
Fred. J. Dole

Inventor:
F. H. Richards (No Model.) 6 Sheets—Sheet 6.

F. H. RICHARDS.
WEIGHING MACHINE.

No. 565,219. Patented Aug. 4, 1896.

Witnesses:
R. W. Pittman
Fred. J. Dole.

Inventor:
F. H. Richards

United States Patent Office.

FRANCIS H. RICHARDS, OF HARTFORD, CONNECTICUT.

WEIGHING-MACHINE.

SPECIFICATION forming part of Letters Patent No. 565,219, dated August 4, 1896.

Application filed September 24, 1895. Serial No. 563,500. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, the object being to provide an improved organization of valve and valve-actuating mechanisms primarily adapted for use in connection with fluid-weighing machines of the oscillatory single-chambered-bucket type.

Figure 1:
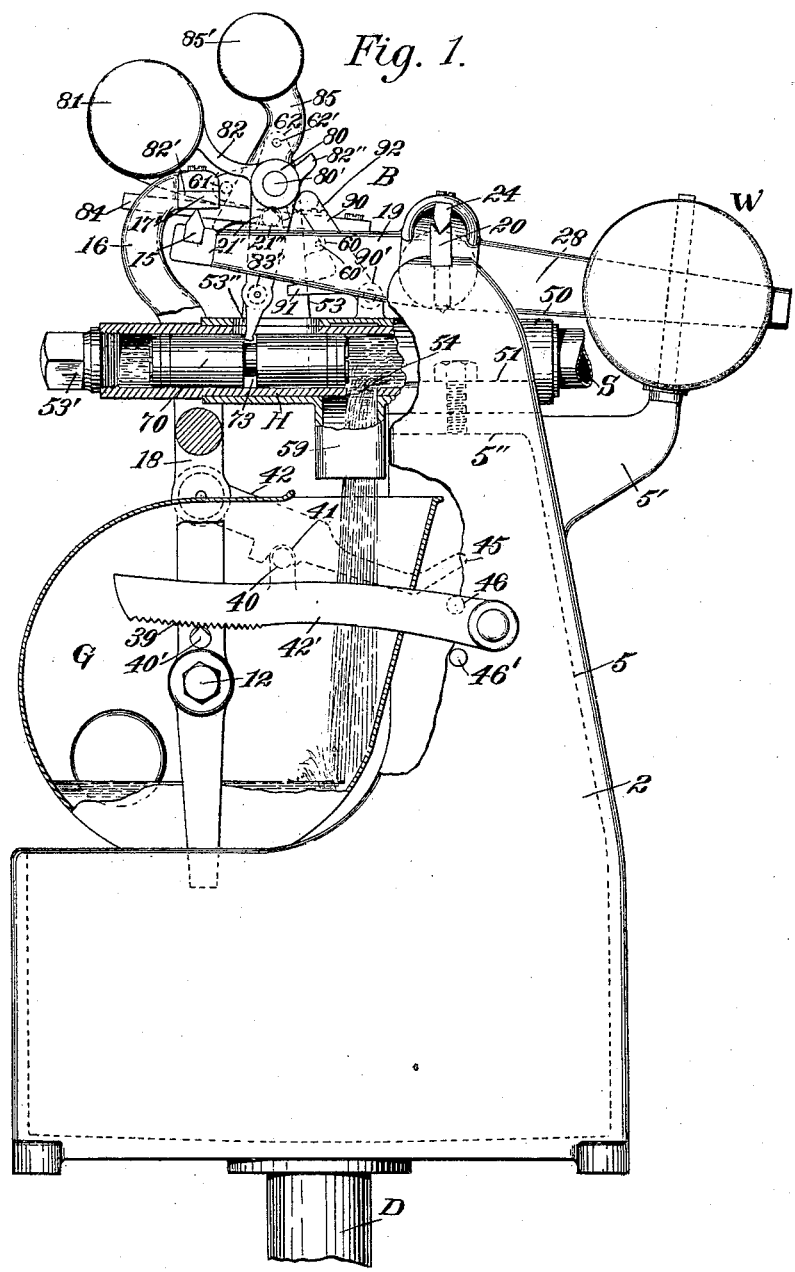
Figure 2:
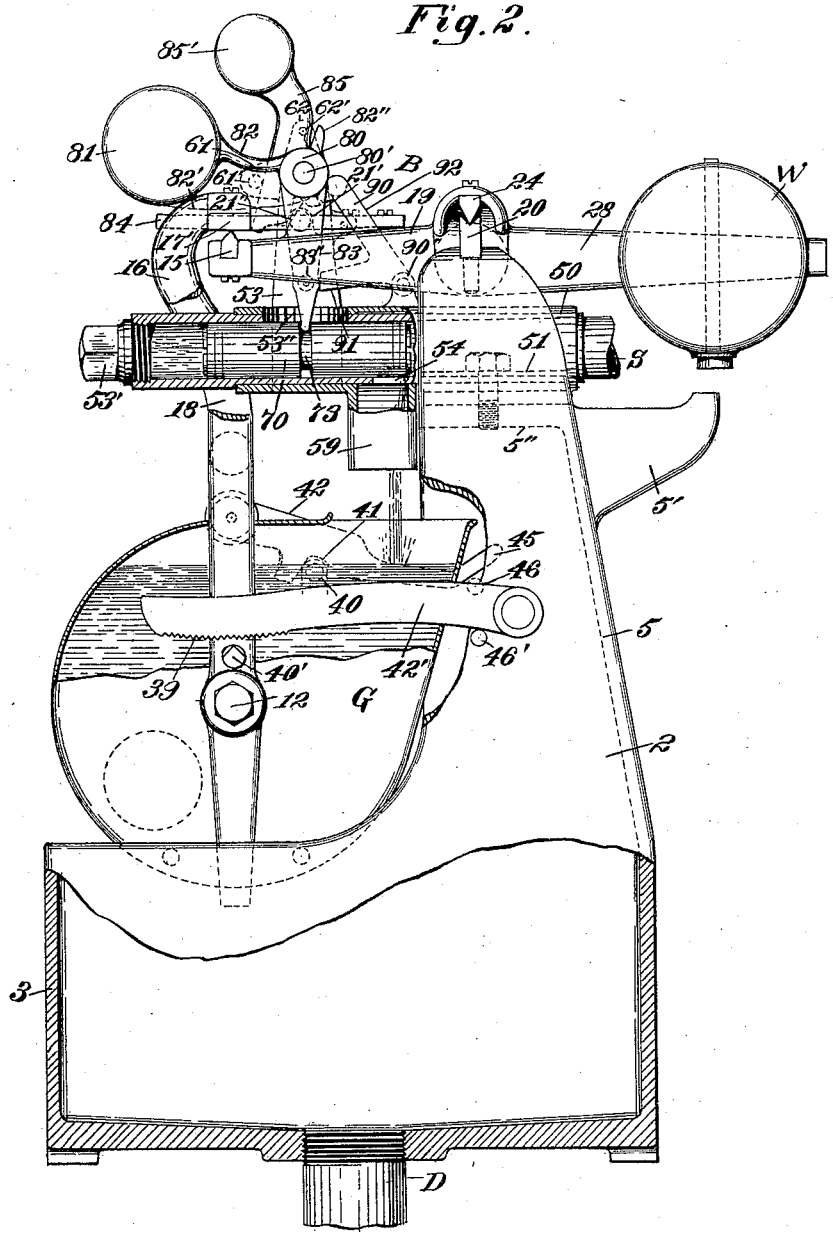
Figure 4:
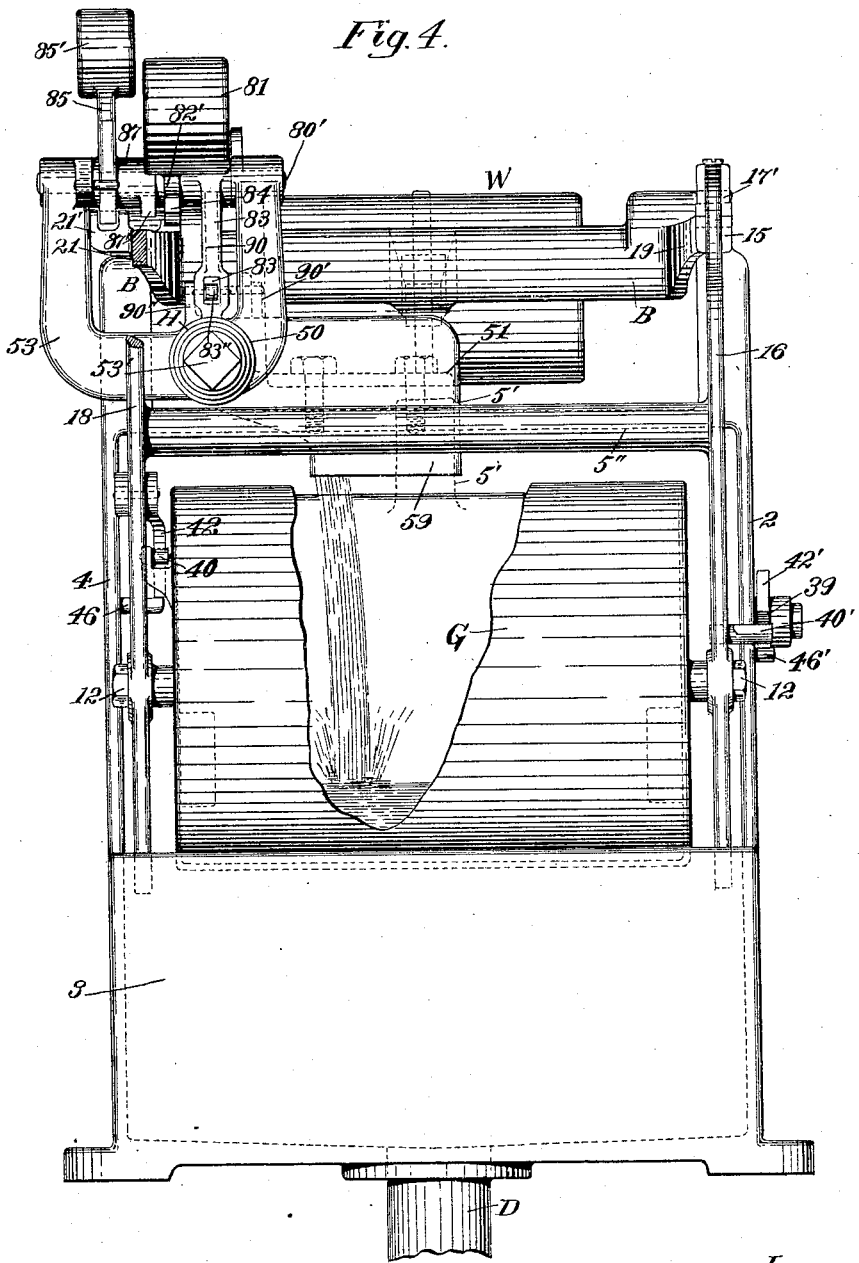
Figure 5:
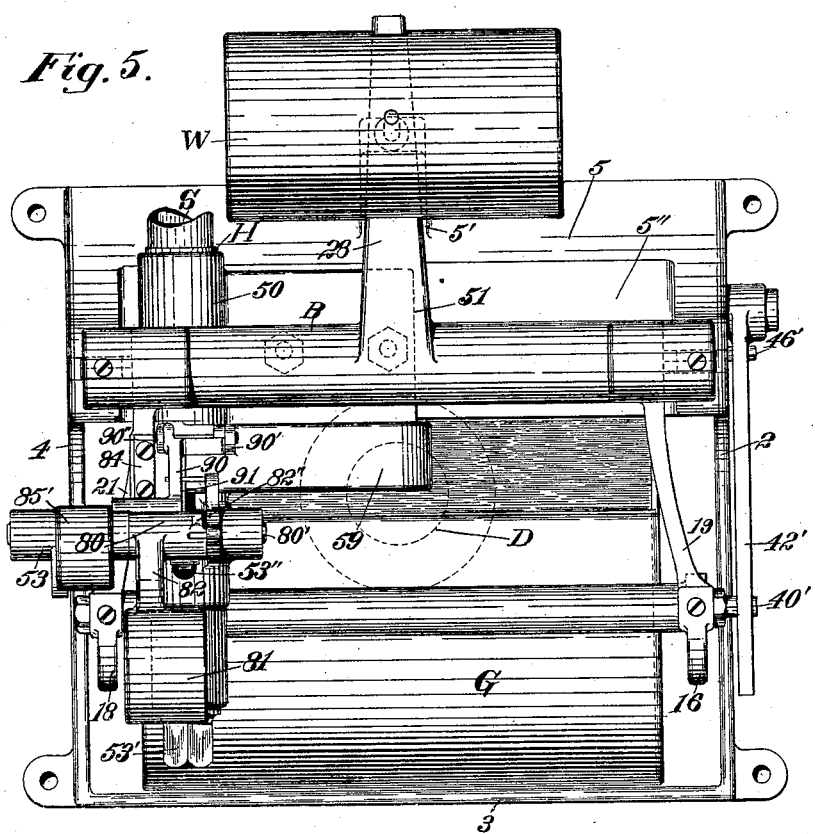
Figure 6:
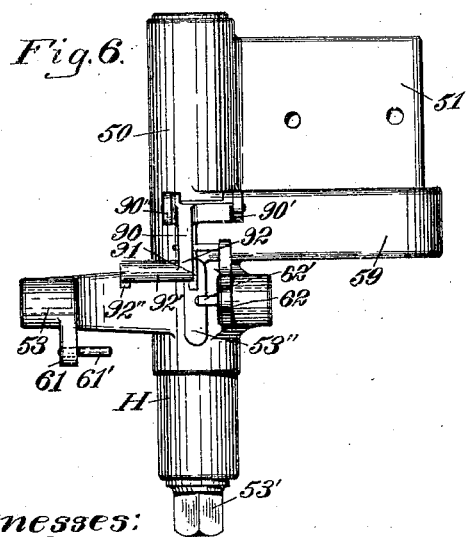
Figure 7:
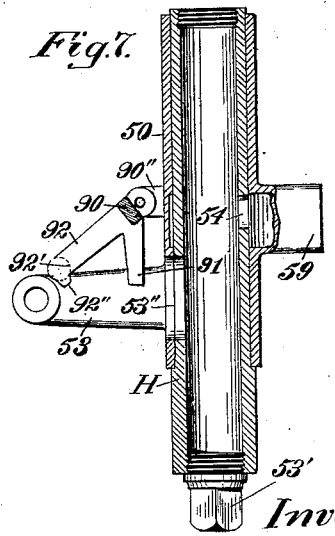
Figure 14:
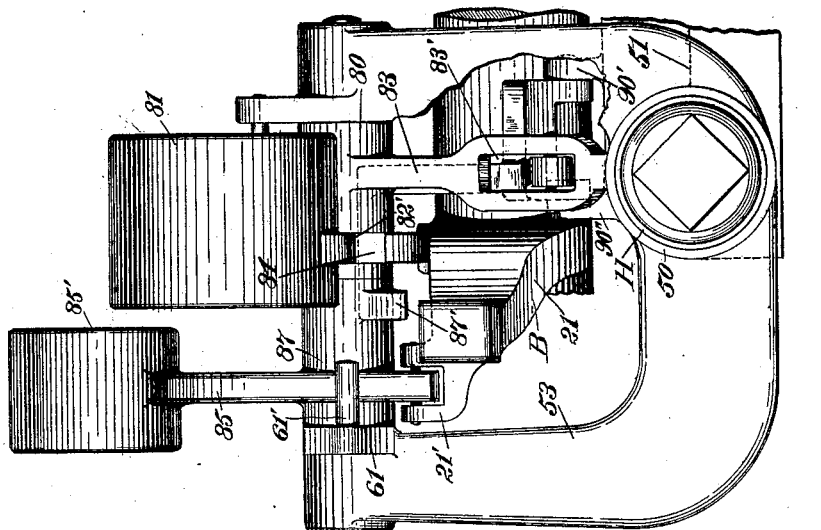
Figure 13:
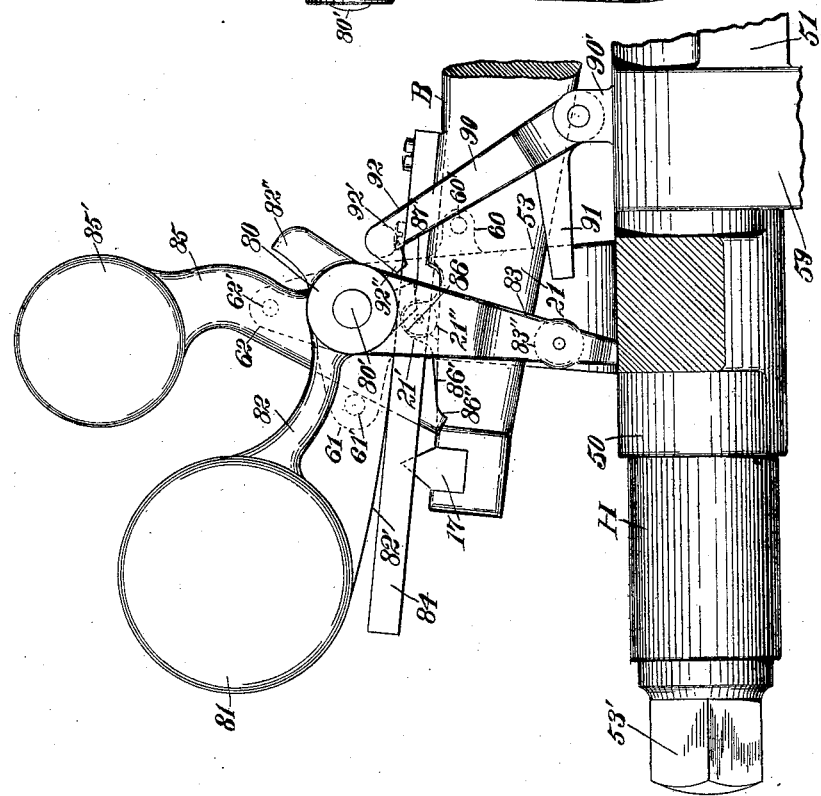

In the drawings accompanying and forming part of this application, Figure 1 is a left-hand end elevation of a weighing-machine embodying my present improvements, the valve being shown in the open position thereof to permit the flow of the full supply-stream into the bucket. Fig. 2 is a similar view of the machine, illustrating the valve in a position to reduce the volume of the supply-stream to a drip-stream. Fig. 3 is a similar view illustrating the valve in a position to cut off the supply-stream and the bucket as discharging the load. Fig. 4 is a front elevation of the machine. Fig. 5 is a plan of the same. Fig. 6 is a detail view, in plan, illustrating the fluid-chamber and certain adjacent parts of the machine. Fig. 7 is a central longitudinal section of the same. Figs. 8, 9, 10, 11, and 12 are detail views of certain parts of the valve. Fig. 13 is an enlarged detail view, in end elevation, illustrating the valve-actuating mechanism and adjacent parts of the machine; and Fig. 14 is a similar view as seen from the left in Fig. 13.

Similar characters designate like parts in all the figures of the drawings.

For convenience in illustrating the nature and purpose of my present improvements, these are shown applied to a weighing-machine of the oscillatory single-chambered-bucket type or class, and the operation of this machine is substantially similar to the one described by prior patent, No. 465,535, granted to me December 22, 1891.

The framework for carrying the operative parts of the machine is illustrated comprising two side frames or members 2 and 4, which are shown formed integral with the end walls of the discharge-receptacle 3, which latter will be hereinafter more particularly described. These side frames or members 2 and 4 are shown connected by a plate 5, which latter is illustrated carrying a stop-arm 5' for limiting the descending movement of the counterweight of the beam mechanism.

The side frames 2 and 4 will each carry a V-shaped or other beam-supporting bearing, and the side frame 2 is illustrated at 20 provided with such a bearing, and the side frame 4 (though not shown) will be similarly equipped. These bearings of the side frames 2 and 4 are adapted to support suitable pivots or knife edges carried by the scale-beam, which latter carries the bucket and its operative devices.

The scale-beam (designated in a general way by B) will be provided with a pair of pivots or knife edges, (one of which is shown at 24,) which are adapted to rest on or be supported by the V-shaped or other bearings of the side frames 2 and 4 of the machine.

The scale-beam B is shown comprising a rearwardly-projecting weight-carrying arm 28 and a pair of forwardly or oppositely disposed bucket-carrying arms, which latter are designated, respectively, by 19 and 21. The rearwardly-projecting arm 28 is shown provided with a counterweight W, which will be secured thereto in some suitable manner. The bucket-carrying arms 19 and 21 will carry knife edges or other suitable pivots, one of which is illustrated at 15, Figs. 1, 2, and 3, and its mate at 17, Fig. 13, and which are adapted to support V-shaped or other bearings of a pair of bucket-carrying hangers, and one of a pair of these V-shaped bearings is shown at 17', carried by the hanger 16.

As a means for supporting the bucket from the rising and falling beam mechanism, the hangers 16 and 18 (shown) will be preferably employed. The bucket (designated in a general way by G) is of the single-chambered type or class, and is shown pivoted at 12 for oscillatory movement between the hangers 16 and 18, and will be normally supported with its receiving end or mouth in position to receive a stream of fluid from a fluid-chamber; and on the completion of the bucket-load will oscillate for discharging the same. It will be evident then that the bucket is oscillatory for discharging the load.

The machine will be provided with the usual poising and counterpoising mechanisms. All that portion of the beam mechanism, including the bucket G, to the left of the beam-supports (see Figs. 1, 2, and 3) constitutes the poising mechanism of the machine; and all that portion of the beam mechanism, including the weight W, to the right of said supports constitutes the counterpoising mechanism of the machine.

For maintaining the bucket in the upper or normal position thereof the latch or detent mechanism shown will preferably be employed. This latch or detent mechanism is so organized that at a predetermined point in the movement of the bucket it is adapted to be tripped, thereby freeing the bucket, at which time the latter may oscillate for discharging the bucket-load.

The bucket G is shown provided with a latch or detent 40, preferably in the form of an antifriction-roller, which is adapted to be engaged by a coöperating detent 41 of a latch 42, which latter is shown pivoted at one end thereof to the bucket-carrying hanger 18. The opposite end of the latch 42 is shown terminating in an inclined portion in such position as to come in contact with a fixed or other stop carried by the side frame 4 of the machine. A stop-pin 46 is shown carried by the side frame 4, and the portion 45 normally stands free of said stop-pin; but, at a predetermined point in the descent of the bucket, said portion 45 is carried into contact with the stop-pin 46. It will be obvious that on the further descent of the bucket the latch 42 will be raised, thereby disengaging the latch-detent 41 from the coöperating detent 40, carried by the bucket. These detents 41 and 40 and the latch 42 and the stop-pin 46 will be so organized as to permit the release and consequent oscillation of the bucket immediately on the completion of the bucket-load. Means will also be provided for limiting the oscillatory motion or tilting of the bucket during the making up of the bucket-load. The bucket-carrying hanger 16 is shown provided with a detent or stop, the upper face of which will be preferably in the form of a knife-edge, and which latter is adapted to be engaged by one of a series of teeth or notches of a rack 39, formed on the detent-lever 42'. The detent-lever 42' is shown pivoted to the side frame 2 and will have a descending movement with the bucket until at a predetermined point in the descent of the bucket it will be engaged by a suitable tripping-stop on the side frame 2, (see Fig. 3,) and it will be obvious that when said detent-lever 42' is engaged by such stop 46' the former will be raised, thereby freeing the rack 39 from the detent 40'. This action will take place at a point just preceding the completion of the bucket-load, whereby the latter will be permitted to oscillate in the manner previously described.

It will be remembered that the bucket G has been described as oscillatory for discharging the bucket-load. The center of gravity of the loaded bucket will be located at one side of the pivot of the loaded bucket, so that when the detent mechanism hereinbefore described has freed the bucket the latter will instantaneously oscillate for discharging the bucket-load. The bucket discharges its load of fluid into the discharge-receptacle 3, which is shown provided with a discharge-pipe D for conducting the fluid therefrom and into suitable vessels or other devices provided for this purpose. The end walls of the bucket G are shown provided with weights of suitable size for returning the bucket from the bucket-discharge position (see Fig. 3) to the normal or stream-receiving position. (See Fig. 1.)

The side-frame-connecting plate 5 is shown having formed at the upper extremity thereof a supporting-flange 5'', which is adapted for supporting the fluid-chamber H in a manner to be now described. A fluid-chamber-surrounding jacket or casing is shown at 50, having formed integral therewith a flange 51, which latter will be secured to the flange 5'' of the connecting-plate 5 in some suitable manner, as by the bolts shown. The jacket 50 is also shown provided with a longitudinal slot or opening to permit of the entrance and working stroke of a valve opening and closing actuator, which opening will be coincident with a second opening formed in the fluid-chamber H. The jacket 50 is also shown provided at a point near its outer end with an upwardly-extending U-shaped yoke 53, which is adapted for carrying the valve opening and closing actuator and other operative and stop devices, in a manner to be hereinafter described.

The fluid-chamber H will be seated tightly in place within the jacket or casing 50, and is shown provided in the under side thereof with a supply port or opening to permit the flow therethrough of the supply-stream into the bucket G.

As a means for supplying the fluid-chamber H with fluid, the supply-pipe S will preferably be employed. The outer end of the fluid-chamber H is also shown provided with a removable air and fluid tight screw-plug 53'. The fluid-chamber is also shown provided in its upper face with a longitudinal slot 53'', coinciding with the slot in the casing or jacket 50, and through these slots a valve-actuator, to be hereinafter described, has its working strokes.

As a means for controlling the supply-stream, the balanced slide-valve 70 will preferably be employed. Said valve will be operative for reciprocatory sliding movement within the fluid-chamber, and will also be provided with the usual packing or packing-rings, serving their well-known purpose, and the packing or packing-rings are shown held in place by the hollow or apertured screws 55 and 56.

As hereinbefore stated, the stream-controlling valve will preferably be a balanced slide-valve, and during the reciprocations of the valve in its opening and closing movements this forms at the outer end of the fluid-chamber H (what is the left in Figs. 1, 2, and 3) a compartment, which will hereinafter be termed a "balance-compartment," and which is adapted for containing a small portion of fluid which flows therein from the supply-pipe S in a manner to be now described, and acts as a fluid-balance or a counter-resistant to the main body of fluid in the fluid-chamber and in the supply-pipe S.

The valve 70 is shown provided with a bore longitudinally thereof, (designated by 71,) which is of relatively small diameter, and through which flows a fine stream of fluid into the balance-compartment of the fluid-chamber, and which fluid, when in the balance-compartment, constitutes a fluid-balance. Means will be provided for regulating the flow into and out of the balance-compartment of this stream of material. The valve is shown provided with a plug or small valve 72, which will have a limited reciprocal movement within a seat formed in the outer end of the stream-controlling valve 70, the outward movement of this plug or valve 72 being limited by the hollow screw 55, which holds the valve-packing in place. The plug or valve 72 is shown provided with a series of induction-ports, (four in number, and designated by 72',) which are shown inclined and narrowest at their inner or receiving end or the point where the small stream flows into the balance-compartment of the fluid-chamber. The inner end of the plug or valve 72 is shown conical, and this conical portion is adapted to fit a correspondingly-formed seat in the valve, and when the stream-controlling valve 70 is in the closed position thereof (see Fig. 3) this conical portion of the plug 72 will be seated tightly in place within its seat, so that the fine stream of fluid from the supply-pipe S cannot then flow into the induction-ports 72' and the balance-compartment of the fluid-chamber. The induction-ports 72' are shown formed a slight distance back of the apex of the conical portion of the plug 72, so that it will be apparent that when the solid portion of the conical part of the plug 72 is in its seat the inflow of the fine stream, hereinbefore referred to, will be effectively checked.

The plug or valve 72 is shown provided with an opening 57 of relatively large diameter, and a second but smaller opening 58 communicating therewith, and also with the balance-compartment, which provides for the slow egress of the fluid from the balance-compartment on the opening movement of the valve, and hence the opening movement of the valve will be correspondingly slow by the gradual reduction in volume of fluid within the balance-compartment. On the opening movement of the valve the pressure of the fluid in the balance-compartment tends to quickly force the conical portion of the plug 72 against its seat within the valve 70, and the egress of the fluid from the balance-compartment of the fluid-chamber will be so regulated that there will remain in said balance-compartment sufficient of the fluid to withstand the pressure of opening the valve, so that said opening movement will be even and unattended by jerky movements. The main body of fluid on the other side of the valve, opposite to the balance-compartment, acts as a cushion or as a fluid-balance on the closing movement of the valve. In addition to securing even opening and closing movements of the valve, the power necessary to actuate the same will be minimized, as the pressure of fluid in the fluid-chamber on both movements acts as an aid to the valve opening and closing actuators, and also prevents sudden movements of the valve in either direction— an undesirable feature in fluid-scales. The valve 70, approximately centrally thereof, is shown provided with a peripheral groove or channel 73, in which will work a valve opening and closing actuator.

On one movement of the valve it will be apparent that the supply-port 54 in fluid-chamber H will be opened to permit the flow therethrough and into the bucket of the supply-stream, and on the opposite movement the supply-port will be closed, thereby cutting off the supply-stream. The casing 50 is shown provided with a second casing or hood 59, depending therefrom, which acts as a scatter-guard and prevents scattering of the fluid when this leaves the supply-port 54, thereby insuring the flow of the whole supply-stream into the bucket.

As a means for actuating the valve 70 to open and close the same, I prefer to employ the valve-actuating mechanism shown. A combined valve opening and closing actuator will preferably be employed, which is separate from the valve, the valve-opening and valve-closing movements of which will be regulated and governed by the movements of the poising mechanism of the machine.

A combined valve opening and closing actuator is shown at 80, pivotally supported for rocking or oscillatory movement between the arms of the yoke 53. The combined valve opening and closing actuator is shown consisting of an angle-lever, and the arm 82 thereof is shown counterweighted at 81. The arm 82 is also shown provided with a slightly-curved working face or cam-face 82', the purpose of which will be hereinafter described.

The second arm 83 of the valve opening and closing actuator, also termed the "actuating-arm," will have its working strokes between the end walls of the coincident longitudinal slots, formed, respectively, in the fluid-chamber casing 50 and the fluid-chamber H, and the lower end of said arm 83 is adapted to engage the valve for actuating the same by entering the peripheral groove or channel 73 of the valve 70, to be loosely operative therein by having a limited movement in said groove or channel.

The poising mechanism, as hereinbefore stated, governs or controls the movements of the valve-actuator 80, and this will be normally supported by said poising mechanism. The poising portion of the beam-arm 21 of the scale-beam B, which is that portion of the scale-beam located at the left in Figs. 1, 2, and 3 of the beam supports or pivots, is illustrated having secured thereto in some suitable manner—as by the fastening-screws shown—a relatively long outwardly-projecting stop or limiting arm 84, which is adapted to support—when the bucket is in its uppermost position and the valve open (the normal position, as shown by Fig. 1)—the curved or working face of the arm 82, and hence the weight 81 of the valve opening and closing actuator 80, and the closing movement of the valve-actuator 80 will be limited by this arm, so that, at a predetermined point in the descent of the bucket and the scale-beam B the arm 84, which normally supports said weight 81, will fall slowly from under said weight 81 and permit a closing movement of the valve. Hence it will be apparent that said arm 84 constitutes a means for limiting the valve-closing movement of the valve-actuator 80. The closing movement of the valve-actuator 80 will be intercepted at a predetermined point in the descent of the bucket, and this action occurs at the commencement of the poising period, whereby the valve will be held against closing movement to permit the flow into the bucket of a reduced or the drip stream, which is generally necessary to complete the partial bucket-load.

The fluid-chamber casing or jacket 50 is shown provided with a pair of brackets or lugs 90' and 90", between which is shown pivoted for oscillatory movement a limiting latch or stop 90. The arm 83 of the valve-actuator 80 is shown provided with a longitudinal slot 83', in which is shown pivoted an antifriction-roll 83", which serves as a stop, and which is adapted to be engaged by a coöperating stop or detent of the latch 90, to thereby limit the valve-closing movement of the valve-actuator and hold the valve temporarily against further closing movement.

The latch or stop 90 is shown provided with a laterally-extending limiting stop-arm or detent 91, which is adapted to engage the stop 83", carried by the arm 83 of the valve-actuator 80, to thereby hold the said actuator 80 against movement, and thereby the valve against closing movement.

The latch or stop 90 will be released by a tripping or releaser device on the further movement of the descending bucket, thereby insuring an instantaneous closure of the valve through the agency of the counterweighted valve-actuator 80. A tripping or releasing lever is shown at 85 in the form of a counterweighted lever, the weight thereof being illustrated at 85'. This tripping or releasing lever 85 is illustrated having a rocking movement between the arms of the yoke 53 and about the same center of movement as the valve-actuator 80, a common pivot for these two members being illustrated at 80'.

The tripping movement of the latch-releasing lever 85 is limited by a suitable stop, which is illustrated carried by the beam-arm 21 of the beam mechanism. The beam-arm 21 is shown carrying a bifurcated bracket 21', between the arms of which is pivoted the stop 21", preferably in the form of an antifriction-roll, as shown. The tripping or releasing lever 85 is shown with a limiting-face, (illustrated as a cam-face 86, Fig. 13.) As the bucket and beam mechanism descend the stop 21" falls slowly from under the limiting-face 86 of the latch-releasing lever 85, permitting a rocking movement to the left of its pivot. (See Figs. 1, 2, and 3.) A second stop-face 86' is also shown formed on the latch-releasing lever 85, and which stop-face is shown as nearly a straight face and merging in the limiting-face 86. It will be obvious that when the stop or antifriction roller 21" leaves the limiting-face 86 and rides over the straight face 86' a sudden movement of the releaser device will follow, and this sudden movement will be utilized for tripping the latch 90, whereby the valve 70 may be closed, to thereby quickly cut off the supply-stream by the valve-actuator 80. On the ascending movement of the beam mechanism, and hence of the beam-arm 21 thereof, the antifriction-roll 21" on said beam-arm will engage and ride over the stop-face 86', which is carried by the lever 85 at a point below its center of movement, thereby slowly oscillating said lever 85. Leaving the stop-face 86', the roll 21", on the continued ascent of the beam-arm, will engage the connected stop-face 86 of relatively greater efficiency than the stop-face 86', thereby imparting an accelerated oscillatory movement to the lever 85 and throwing this over to its normal position, as indicated by Figs. 1 and 13. So long as the antifriction-roll 21" is in its uppermost position, as indicated in Figs. 1 and 13, the antifriction-roll 21", engaging the stop-face 86, will positively hold the lever 85 against movement in either direction, the tendency, however, of this lever being to oscillate to the left, as the center of gravity thereof, as has been hereinbefore stated, is located at that side of a vertical line intersecting the center of movement of said lever. Hence on the descending movement of the beam mechanism the stop 21" tends to limit the shifting movement of the lever 85 and the latch-releasing device which is operative therewith. The hub 87 of the lever 85 is shown provided with a projection 87', constituting a releaser device, which is adapted to come in contact with a properly-positioned arm on the holding-latch 90 to thereby trip the latter, so that the valve may be closed.

The latch 90 is shown provided with an upwardly-extending arm 92, which is provided with a laterally-projecting stop-arm 92', having a stop 92'', adapted to be engaged by the projection 87' of the latch-releasing lever 85. It will be understood that when the stop 92'' is so engaged by the projection 87' of the latch-releasing lever the latch 90 will be raised or oscillated about its pivot, and that the detent 91 of said latch will also be raised clear of the stop 83'' of the arm 83 of the valve-actuator 80, thereby freeing the valve 70; and this arm 91, on the closing movement of the valve-actuator, will be projected into the slot 83' of said arm 83. As a means for maintaining the latch in an operative position, where it may engage the coacting stop of the valve-actuator on the closure of the valve, the inner arm of the yoke 53 is shown provided with a lug or projection 60, which is illustrated carrying a suitable stop, as 60', for supporting the latch 90, to thereby maintain the latch in the operative position thereof.

The latch-releasing lever 85 is shown provided with a stop-abutment 86'' in line with the stop-face 85', which is adapted to limit the oscillatory movement of the lever 85 in one direction by impinging against the roll or stop 21'', which action takes place on the final closing movement of the valve.

It will be observed, on reference to Figs. 1, 2, and 3, that the center of gravity of the releaser device 85 is located at one side of a vertical line passing through the center of movement of said releaser device 85—that is, at the left hand of said line—and the movement to the left of said releaser device will be limited by the stop-faces 86 and 86' and the stop-abutment 86''. To provide against the opposite movement of the releaser device 85, a properly-positioned stop will be employed. The outer arm of the yoke is shown provided with a projection or lug 61, which is illustrated carrying a stop-pin 61', against which the lever 85 will abut on the opposite movement of said lever and on the ascending movement of the bucket.

It will be remembered that a stop has been described engaging a coacting stop to hold the valve-actuator 80 against valve-closing movement at a predetermined point in the descent of the bucket. It will be obvious that when this valve-actuator is so held the bucket will continue to descend, as will also the beam mechanism; and it will also be obvious that when the valve-actuator 80 is so engaged the weight 81 thereof will stand clear of the arm 84, carried by the poising mechanism of the machine, thereby subtracting that much weight from off the poising mechanism. The bucket-load will then be nearly complete, the valve being nearly closed—that is, in a position to permit the flow into the bucket of the drip-stream. On the closure of the valve, when the drip-stream is cut off, the arm of the valve-actuator will be engaged by a suitable stop to hold said actuator against further closing movement, the weight thereof then being off the poising mechanism. The arm 82 of the valve-actuator is shown having formed thereon a stop-abutment 82'', which is adapted to abut against a coöperating stop 62', carried by the lug 62, which is illustrated formed on the inner arm of the yoke 53. It will be obvious that on the ascending movement of the bucket and the beam mechanism the arm 84 will engage the curved face 82' of the weighted arm 82 of the valve-actuator 80, thereby raising said arm and oscillating the valve-actuator, whereby this may be effective for opening the valve. From the preceding description of the valve-actuator 80 it will be evident that the valve-closing movement thereof is limited by and during the descending movement of the poising mechanism, and that said actuator is adapted to open the valve by and during the ascending movement of the poising mechanism.

The operation of a machine embodying the present improvements, briefly described, is as follows: Fig. 1 illustrates the normal position of the machine. The valve is illustrated open to permit the flow of the full supply-stream into the bucket. When a sufficient quantity of the fluid has been received by the bucket, this and the beam mechanism tends to slowly descend, and in descending the arm 84, carried by the poising mechanism, permits a slow closing movement of the valve by falling from under the arm 82 of the valve-actuator 80. When the bucket-load is nearly completed, or at the commencement of the poising period, (see Fig. 2,) the stop-arm 91 of the latch or limiter 90 will engage the coöperating stop 83'', carried by the valve-actuator 80, and will hold the said valve-actuator, and thereby the valve 70, against further closing movement, the supply-stream in the meantime, by the closing of the valve 70, having been reduced in volume to a drip-stream. When the valve is so held, the bucket G continues to descend, and at the close of the poising period, or when the bucket-load is completed, the releaser device 85 trips the latch 90, thereby raising the same and disengaging the stops 91 and 83'', and also permitting the closing movement of the valve for cutting off the drip-stream. At about this time the inclined portion 45 of the detent-lever 42 will be in engagement with the stop-arm 46, carried by the side frame, and said lever will be raised, thereby freeing the detents 41 and 40, respectively, of the lever and of the bucket. As soon as these are released, the bucket will be immediately oscillated (see Fig. 3) by reason of the weight of the fluid therein to the rear of the pivot of the bucket, and the bucket-load will be discharged into the fluid-chamber 3, and will be conducted out the discharge-pipe D, and may be received by suitable vessels or other means provided for this purpose.

Having thus described my invention, what I claim is—

1. In a weighing-machine, the combination with a beam mechanism, and with a bucket supported thereon for ascending and descending movements; of a chamber having a supply-port; a bored slide-valve operative in said chamber, and so located therein, as to form a space at one side thereof constituting a balance-compartment, into which fluid may flow through the bored valve; a second valve for controlling the flow of material through said bored valve; and valve-actuating mechanism, operative on the ascending and descending movements, respectively, of the bucket, for opening and closing said first-mentioned valve.

2. In a weighing-machine, the combination with beam mechanism and with a bucket supported thereon for ascending and descending movements; of a chamber having a supply-port; a bored slide-valve operative in said chamber, and so located therein, as to form a space at one side thereof constituting a balance-compartment, and having a conical valve-seat located in an end thereof; a conical plug-valve located in said seat, and having a series of peripheral ports, which, when said valve is forced away from its seat on one reciprocation of the first-mentioned valve, permits the passage of a stream of material into the balance-compartment; and valve-actuating mechanism, operative on the ascending and descending movements of the bucket, respectively, for opening and closing said first-mentioned valve.

3. In a weighing-machine having poising and counterpoising mechanisms, and a bucket supported by, and forming part of, said poising mechanism; the combination with a fluid-chamber having a supply-port adapted to permit the supply-stream to flow therethrough and into the bucket; of a slide-valve operative in said fluid-chamber and adapted to open and close said supply-port, said valve having also a peripheral channel; a combined valve opening and closing actuator consisting of an angle-lever having one arm of said lever loosely operative in said channel to thereby actuate the valve, and having the other arm of said lever counterweighted to thereby close the valve, and having said valve-closing movement limited by, and during the descending movement of, the poising mechanism, substantially as specified.

4. In a weighing-machine, the combination with beam mechanism; of a bucket supported thereby; a fluid-chamber having a supply-port therein adapted to supply a stream of fluid to the bucket; a longitudinally-bored valve operative in said fluid-chamber, and located within the fluid-chamber to form a space at one side of the valve and within the fluid-chamber, constituting a balance-compartment and adapted also for containing a body of fluid; a plug having a relatively small opening interiorly thereof and operative within the valve, and also having a conical portion adapted to be seated in a correspondingly-formed seat in the valve to thereby regulate the slow egress of the fluid from the balance-compartment, said plug also having a series of ports exterior thereof to permit the flow therethrough of a stream of material into the balance-compartment; and means for opening and closing said valve, during the ascending and descending movements, respectively, of the beam mechanism, substantially as specified.

5. In a weighing-machine, the combination with beam mechanism, and with a bucket supported thereon for ascending and descending movements; of a chamber having a supply-port therein; a valve operative in said chamber; a jacket surrounding said chamber, and having a downwardly-projecting hood extending around said supply-port and constituting a scatter-guard; and valve-actuating mechanism, operative during the ascending and descending movements of the bucket, for opening and closing said valve.

6. In a weighing-machine having poising and counterpoising mechanisms, and a bucket supported by, and forming a part of, said poising mechanism; the combination with means for supplying a stream of fluid to the bucket; of a valve in position for controlling the supply-stream; a combined valve opening and closing actuator in position to have the valve-closing movement thereof limited by, and during the descending movement of, said poising mechanism, and also to open the valve by, and during the ascending movement of, said poising mechanism; a latch in position for engaging said actuator during the closing movement thereof; and a releaser device in position for releasing the engagement of said latch with the said actuator to thereby permit the valve-closing movement of said actuator, substantially as specified.

7. In a weighing-machine having poising and counterpoising mechanisms, and a bucket supported by, and forming part of, said poising mechanism; the combination of means for supplying a stream of fluid to the bucket; a valve in position for controlling the supply-stream; a combined valve opening and closing actuator having a stop, and in position to have its valve-closing movement limited by, and during the descending movement of, the poising mechanism, and to open the valve by, and during the ascending movement of, said poising mechanism; a latch having a stop-arm in position to engage the stop carried by said actuator and to hold the same, and thereby the valve, against closing movement; and a releaser device for releasing said stops from engagement to thereby permit the closing movement of the valve, substantially as specified.

8. In a weighing-machine having poising and counterpoising mechanisms, and having a bucket supported by, and forming part of, the poising mechanism; the combination with means for supplying a stream of fluid to the bucket; of a valve in position for controlling the supply-stream; a combined valve opening and closing actuator having an antifriction-roll constituting a stop, and in position to have the valve-closing movement limited by, and during the descending movement of, the poising mechanism, and to open the valve by, and during the ascending movements of, said poising mechanism; a pivoted latch having a stop-arm in position to engage the stop carried by the valve-actuator to hold the same, and thereby the valve, against closing movement, said latch also having a second stop-arm; and a releasing device in position and adapted to engage said second-mentioned stop-arm to thereby trip the latch and disengage the first-mentioned stop-arm from the stop on the actuator to thereby permit a closing movement of the valve, substantially as specified.

9. In a weighing-machine, the combination with beam mechanism, and with a bucket supported thereby; of a fluid-chamber having a supply-port therein to permit the flow therethrough of a supply-stream into the bucket, and also having a longitudinal slot therein; a valve operative in said fluid-chamber, and adapted for controlling the supply-stream; a removable plug seated in one end of the fluid-chamber; a jacket surrounding said fluid-chamber, and having a longitudinal slot coinciding with that formed in the fluid-chamber; and a valve-actuator in position for engaging the valve to alternately open and close the same, and having the working strokes thereof between the walls of the coinciding slots formed, respectively, in the fluid-chamber and in the jacket therefor, substantially as specified.

10. In a weighing-machine having poising and counterpoising mechanisms, and a bucket supported by, and forming part of, said poising mechanism; the combination with means for supplying a stream of fluid to the bucket; of a valve in position for controlling the supply-stream; a combined valve opening and closing actuator in position and adapted to have the valve-closing movement limited by, and during the descending movement of, said poising mechanism, and also adapted to open the valve by, and during the ascending movement of, the poising mechanism; a latch in position and adapted for intercepting the valve-closing movement of said actuator; a releaser device in position and adapted for tripping said latch to thereby permit a closure of the valve; and means in position and adapted for limiting the tripping movement of said releaser device, substantially as described.

11. In a weighing-machine having poising and counterpoising mechanisms, and a bucket supported by, and forming part of, the poising mechanism; the combination with means for supplying a stream of fluid to the bucket; of a valve in position for controlling the supply-stream; a combined valve opening and closing actuator in position to have its closing movements limited by, and during the descending movement of, said poising mechanism, and also to open the valve by, and during the ascending movement of, said poising mechanism; a stop carried by the poising mechanism; a latch in position for holding the actuator against valve-closing movement at a predetermined point; a latch-releasing lever having a releasing device, and also having a stop-face adapted to engage the stop carried by the poising mechanism, whereby said stop will be effective to limit the tripping movement of said lever, and adapted also to release said lever on the descending movement of the poising mechanism, whereby the releasing device thereon will trip said latch to thereby permit a closing movement of the valve, substantially as specified.

12. In a weighing-machine, the combination with a bucket and with the supporting-beam mechanism therefor; of a fluid-chamber having a supply-stream port therein; a balanced slide-valve operative in said chamber; means for actuating the valve to open and close the same, and means for intercepting the closing movement of the valve at a predetermined point in the operation of the same, and also for releasing said valve, substantially as specified.

13. In a weighing-machine having ascending and descending poising mechanism, embodying a bucket, the combination with a chamber, of a valve operative therein; actuating mechanism for opening and closing said valve; a latch for engaging the valve-closing mechanism at a predetermined point in the closing movement of the valve; a releaser device operative for releasing the valve; and a stop carried by the poising mechanism for limiting the latch-releasing movement of said releaser device.

FRANCIS H. RICHARDS.

Witnesses:
F. N. CHASE,
FRED. J. DOLE.